UNITED STATES PATENT OFFICE.

MAXIMILIAN CARL LUDWIG ALTHAUSSE, OF BILLWÄRDER-AN-DER-BILLE, GERMANY, ASSIGNOR TO FABRIK CHEMISCHER PRAEPARATE VON DR. RICHARD STHAMER, OF HAMBURG, GERMANY.

PROCESS OF PRODUCING PURE SAPONIN SOLUTIONS.

SPECIFICATION forming part of Letters Patent No. 679,202, dated July 23, 1901.

Application filed August 6, 1900. Serial No. 26,090. (No specimens.)

*To all whom it may concern:*

Be it known that I, MAXIMILIAN CARL LUDWIG ALTHAUSSE, a subject of the German Emperor, and a resident of Billwärder-an-der-Bille, near Hamburg, in the German Empire, have invented a certain new and useful Process of Producing Pure Saponin Solutions, of which the following is a specification.

The saponin extracts which are obtained by extracting quillaya-bark with water and used for cleaning textile fabrics possess all the same faults that they contain large quantities of coloring-matter and other impurities and are therefore unsuited for cleaning delicate fabrics, particularly if the latter are colored by sensitive dyes. All attempts hitherto made with a view to remove said impurities failed because the chemicals used for such removal of impurities from the extracts or decoctions made from the bark in question remained partially in the concentrated extract, thus diminishing the real value of the same, whereas a complete chemical purification of the extracts is too expensive.

According to the present invention a simple and cheap method has been found by means of which a pure extract of saponin is produced which is perfectly appropriated to all technical purposes and which results from the addition of small quantities of formaldehyde to the aqueous extracts having large quantities of coloring-matter.

If merely a few drops of formaldehyde solution are added to an aqueous extract of the bark and the latter is then boiled, it will be at once seen that the greater part of the coloring and albuminic matters contained in the extract are precipitated in the form of dense brown flakes. The filtrates, however, are somewhat discolored and still contain an impurity in the shape of lime. The latter may be easily separated by adding a suitable acid, as diluted sulfuric acid, to the extract until a slightly acid reaction takes place, or any other suitable acid may be used that will form, with lime, insoluble precipitates. If the extracts are now evaporated to the consistency of a syrup and left standing for some time, the greater part of the sulfate of lime is precipitated in the form of perfect crystals. The sulfuric acid has the additional purpose of accelerating the filtration of the extracts, which, without such addition, proceeds at an excessively slow rate; but a far better result is attained if the formaldehyde and the sulfuric acid are not added to the aqueous solutions after extraction but allowed to act on the same during the process of extraction from the bark. Aqueous solutions containing but very little coloring-matter are then obtained. The saponin obtained by evaporation is nearly white and quickly and clearly soluble in water.

The process is carried out in the following manner: One hundred and fifty kilograms of quillaya-bark, cut fine, are boiled in a suitable vessel with six hundred liters of water, to which are added five to seven kilograms of formalin (containing forty per cent. formaldehyde) and later on diluted sulfuric acid to produce a weak acid reaction, and after the mixture has been thoroughly boiled a similar quantity of water, formalin, and acid are added. The extract thus obtained is filtered from the bark and boiled in an enameled cast-iron boiler provided with a steam-jacket until it acquires a syrup-like consistency. It is then allowed to stand for about twelve hours. The precipitated sulfate of lime is then removed and the extract during continuous stirring evaporated to dryness, preferably *in vacuo*. The saponin thus obtained has when pulverized a slightly yellowish gray tint, causes violent fits of sneezing when handled, and is clearly soluble in water, the aqueous solution producing a thick white foam, which keeps for quite a long period.

Having fully described my invention, what I claim, and desire to secure by Letters Patent, is—

1. The process of producing a pure saponin solution which consists in reacting upon a suitably-heated solution of saponin with a solution of formaldehyde and removing the resultant precipitate, substantially as and for the purpose described.

2. The process of producing a pure saponin solution which consists in reacting upon a suitably-heated solution of saponin with a solution of formaldehyde and with an acid capable of forming an insoluble precipitate with the lime in the solution and removing the resultant precipitates, substantially as and for the purpose described.

3. The process of producing a pure saponin solution which consists in decocting quillaya-bark by boiling in water and reacting upon the boiling solution with formalin and an acid capable of forming an insoluble salt with the lime in the solution and removing the resultant precipitates from the bark by filtration, substantially as and for the purpose described.

MAXIMILIAN CARL LUDWIG ALTHAUSSE.

Witnesses:
MAX LEMCKE,
E. H. L. MUMMENHOFF.